United States Patent Office 3,435,702
Patented Apr. 1, 1969

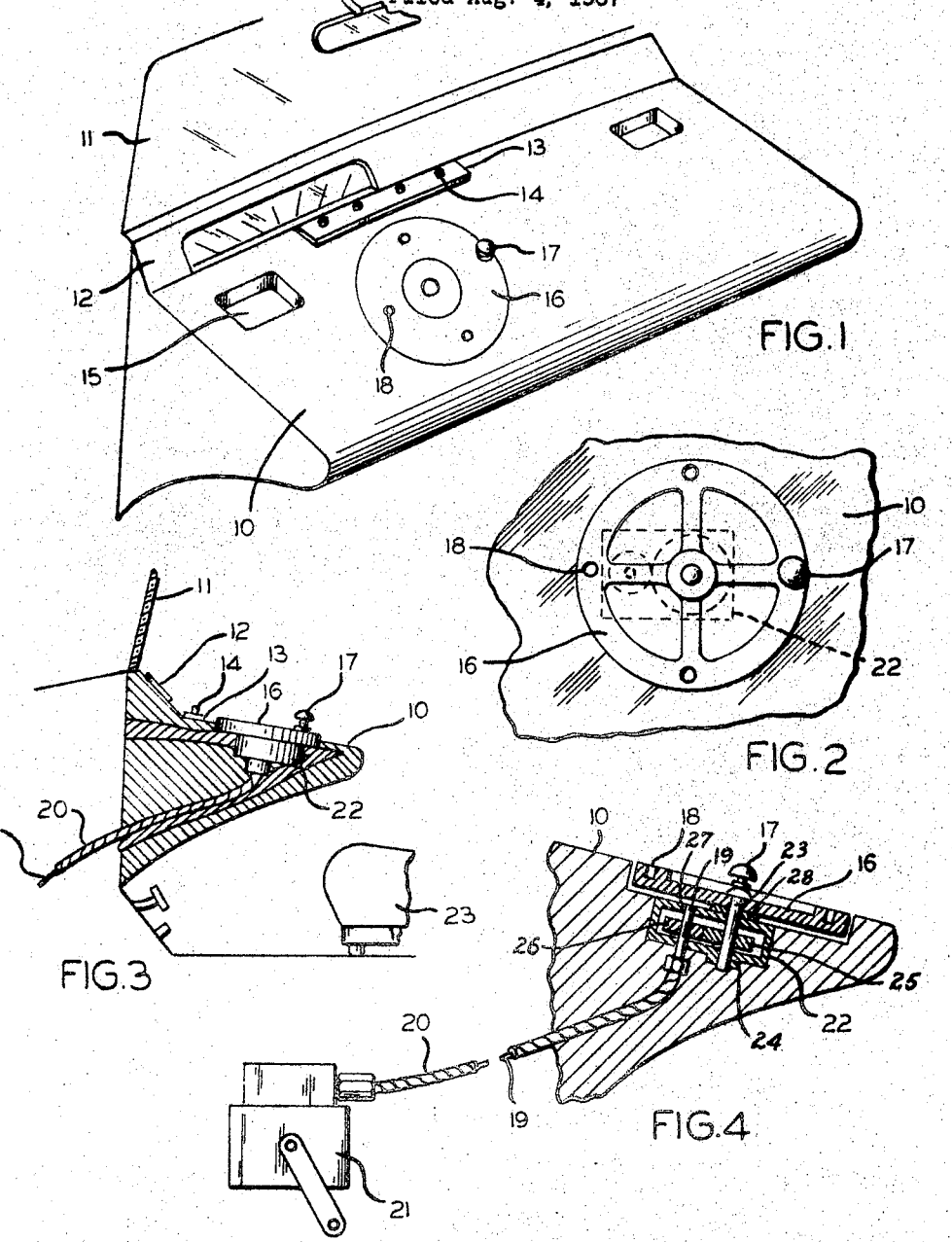

3,435,702
AUTOMOTIVE STEERING
Gordon Smith, 2804 N. 44th St.,
Milwaukee, Wis. 53210
Filed Aug. 4, 1967, Ser. No. 658,463
Int. Cl. G05g 1/10
U.S. Cl. 74—552                      4 Claims

ABSTRACT OF THE DISCLOSURE

A steering wheel for a vehicle is rotatably mounted within a recess in a padded horizontal dashboard wherein the steering wheel is associated with a shaft which is in turn associated with a power steering mechanism of the vehicle. The steering wheel can be manipulated while the arms rest in a relaxed position on the dashboard.

---

My invention relates to a steering wheel for automotive vehicles, and more particularly to a steering wheel to actuate a flexible shaft for steering the vehicle.

The prime object of my invention is to provide a steering wheel that may be mounted and recessed into a padded horizontal dashboard for the safety and convenience of the operator of the vehicle.

Another object of my invention is to provide a device of the character described that is designed to rotatably move a flexible shaft extending from the wheel to a conventional power steering mechanism, forming a part of the vehicle assembly.

Still another object of the invention is to construct the steering wheel in a manner so that it may be manipulated with ease as the arms of the operator rest in a relaxed position.

A further object of my invention is to construct the steering wheel so that it may be manipulated while the operator of the vehicle is in a relaxed, comfortable position, due to the construction of the padded dash into which the wheel is recessed, and as described and claimed in my copending patent application.

It is manifest to anyone familiar with the art of driving and propelling an automotive vehicle that there is a terrific hazard caused by the conventional steering wheel mounted onto a rigid wheel support, due to the impact of the driver when the vehicle collides with some other vehicle or rigid article, and it is the prime object of my invention to provide a means of mounting the wheel in a padded protective dashboard, and employing a flexible shaft encased in a flexible tube extending from the wheel to the conventional automobile power steering unit, forming a part of the vehicle to which it is applied.

The device illustrated, described and claimed herein is simple in construction, easy to operate, positive in performance, and when mounted in a recessed fashion into the padded dashboard eliminates the hazards created by the prior art.

Other and further objects of my invention will become more apparent as the description proceeds, when taken in conjunction with the drawings in which:

FIGURE 1 is a perspective view of the device constituting my invention imbedded into a padded horizontal dashboard forming a part of the vehicle.

FIGURE 2 is a top view of the imbedded wheel equipped with a knob which may be positioned into the circular rim of the wheel at varied positions for the convenience of the operator.

FIGURE 3 is a vertical cross-section of the dashboard with the steering wheel imbedded therein, and showing the flexible shaft leading therefrom, and FIGURE 4 is a similar cross-sectional view of the dashboard and wheel, and showing the flexible shaft leading from the wheel to the conventional power steering unit forming a part of the vehicle.

Similar characters of reference indicate corresponding parts throughout the several views, and referring now to the same, the character 10 shows a horizontally disposed dashboard extending laterally across the front of the vehicle, adjacent to the windshield 11, and provided with an instrument panel 12 and a plate 13 supporting a plurality of push buttons for the control of the various accessories (not shown). If desired, the dashboard may also have a plurality of conventional ash trays shown as 15, disposed into its surface.

There is a steering wheel 16 mounted in a recessed manner into the upper surface of the padded dashboard 10, the wheel 16 may be of any desired design, and is equipped with an upwardly extending knob 17 which may be placed into any one of the plurality of recesses shown as 18, to enable the operator of the vehicle to steer the automobile with either his right or left hand while his arm is conveniently resting on the top surface of the dashboard 10.

The wheel 16 may be mounted in any practical manner (see FIGURE 3), and has a flexible shaft 19 encased in a flexible tube 20 leading from the wheel 16 to the power steering mechanism generally shown as 21 in FIGURE 4.

The steering mechanism may be of any practical design and the manipulation of the shaft 19 by the wheel 16 may be accomplished in any practical manner such as that shown in FIGURE 4 at 22. More particularly, as shown in FIGURE 4, the steering wheel 16 is fixedly attached to an axle shaft 23 that extends downwardly therefrom. The shaft 23 extends through an opening in the top of unit 22 and into bearing surface opening 24 located at the bottom of unit 22. A gear unit 25 is fixed to shaft 23 in any well known manner, such as through the use of a key arrangement. The gear 25 meshes with a gear 26 that is fixed in any well known manner such as through the use of a key arrangement to the top portion of shaft 19. Shaft 19 fits through a hole at the bottom of unit 22, and is fixed in a bearing arrangement at 27 at the top of unit 22. A spacer or washer 28 may be placed between unit 22 and the steering wheel 16.

This construction eliminates any rigid steering wheel post facing the driver seated in the adjustably mounted driver's seat 23, as shown in FIGURE 3.

From the above description, it will become manifest to anyone familiar with driving an automobile or the like, that the recessed steering wheel permits the driver to rest his arms comfortably onto the upper surface of the horizontal dashboard. By inserting the knob 17 into any of the apertures 18, the wheel can be manipulated with either the right or left hand, and the cushioned dashboard will protect the driver from contact with the steering wheel during an impact.

Although I have shown a specific construction of the parts and their arrangement, I am fully cognizant of the fact that many changes may be made in the parts and their arrangement without affecting the operativeness of the device, and I reserve the right to make such changes as I may deem convenient without departing from the spirit of my invention or the scope of the appended claims.

Having thus described my invention, what I claim and desire to secure by Letters Patent in the United States is:

1. An improved steering system for an automotive vehicle having supporting wheels and being steered by changing the direction of at least one set of said supporting wheels,
    said steering system comprising:
    a dashboard located in said vehicle, said dashboard having a recess portion therein, and
steering wheel means shaped to fit rotatably within said recess in said dashboard,
said top surface of said steering wheel means extending only up to the top surface of said dashboard.

2. The steering system of claim 1 wherein said dashboard is padded.

3. The steering system of claim 2 wherein said steering wheel comprises a plurality of recesses at the outer periphery thereof, and
upwardly extending knob means which can be selectively placed in any of said steering wheel recesses.

4. The steering system of claim 3 wherein said steering wheel is coupled to steer said support wheels through a flexible shaft, and
wherein said flexible shaft is coupled to said steering wheel through a steering mechanism unit,
said steering mechanism unit comprising first gear means coupled to a center shaft of said steering wheel and extending into said steering unit, and
another gear means coupled to said shaft and meshing with said first gear means for causing said flexible shaft to turn responsive to the operation of said steering wheel.

References Cited

UNITED STATES PATENTS

| | | | |
|---|---|---|---|
| 3,282,124 | 11/1966 | Peterson | 74—496 X |
| 3,368,422 | 2/1968 | Walter | 74—493 |
| 3,380,548 | 4/1968 | Bauer | 180—90 |

LEONARD H. GERIN, *Primary Examiner.*

U.S. Cl. X.R.

74—388, 577; 180—90